US011238894B2

(12) United States Patent
Herdendorf et al.

(10) Patent No.: US 11,238,894 B2
(45) Date of Patent: *Feb. 1, 2022

(54) STORAGE SYSTEM WITH ACTUATED MEDIA PLAYER

(71) Applicant: Seagate Technology LLC, Fremont, CA (US)

(72) Inventors: Brett R. Herdendorf, Mound, MN (US); Jon D. Trantham, Chanhassen, MN (US); Anil J. Reddy, Minneapolis, MN (US); Riyan Alex Mendonsa, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,716

(22) Filed: Sep. 30, 2020

(65) Prior Publication Data

US 2021/0020198 A1 Jan. 21, 2021

Related U.S. Application Data

(63) Continuation of application No. 16/358,255, filed on Mar. 19, 2019, now Pat. No. 10,818,318.

(51) Int. Cl.
| | |
|---|---|
| *G11B 15/68* | (2006.01) |
| *G11B 20/10* | (2006.01) |
| *G11B 33/12* | (2006.01) |
| *G11B 17/22* | (2006.01) |
| *G11B 33/04* | (2006.01) |

(52) U.S. Cl.
CPC ............ *G11B 15/682* (2013.01); *G11B 17/22* (2013.01); *G11B 20/10* (2013.01); *G11B 33/128* (2013.01); *G11B 33/0466* (2013.01)

(58) Field of Classification Search
CPC ... G11B 25/043; G11B 19/28; G11B 23/0323; G11B 19/209; G11B 33/124; G11B 33/0466; G11B 33/128
See application file for complete search history.

(56) References Cited

U.S. PATENT DOCUMENTS

| | | |
|---|---|---|
| 4,346,416 A | 8/1982 | Riggle et al. |
| 4,580,254 A | 4/1986 | Hojyo |
| 4,675,856 A | 6/1987 | Rudy et al. |
| 4,937,690 A | 6/1990 | Yamashita et al. |
| 5,099,465 A | 3/1992 | Geiger |
| 5,128,912 A | 7/1992 | Hug |
| 5,175,657 A | 12/1992 | Iftikar |
| 5,235,481 A | 8/1993 | Kamo |
| 5,502,697 A | 3/1996 | Taki |
| 5,504,873 A | 4/1996 | Martin et al. |
| 5,513,055 A | 4/1996 | McGrath |

(Continued)

FOREIGN PATENT DOCUMENTS

KR 100630739 B1 10/2006

*Primary Examiner* — Brian E Miller
(74) *Attorney, Agent, or Firm* — Holzer Patel Drennan (57) ABSTRACT

A data storage library includes a number of storage cartridges arranged in a rack accessed by a actuated media player. The actuated media player is adapted to move the along a plane relative to a fixed subset of the storage cartridges in the rack to and to selectively couple to each storage cartridge of the fixed subset to facilitate selective read/write access.

18 Claims, 8 Drawing Sheets

(56) References Cited

U.S. PATENT DOCUMENTS

| | | |
|---|---|---|
| 5,664,284 A | 9/1997 | Brzoska |
| 5,923,638 A | 7/1999 | Watanabe |
| 5,982,719 A | 11/1999 | Nishijima |
| 5,995,320 A | 11/1999 | Ostwald |
| 6,064,544 A | 5/2000 | Wada |
| 6,212,139 B1 | 4/2001 | Nakamura |
| 6,262,863 B1 | 7/2001 | Ostwald et al. |
| 6,587,405 B1 | 7/2003 | Klein |
| 6,636,778 B2 | 10/2003 | Basham et al. |
| 6,650,961 B2 | 11/2003 | Deckers |
| 6,957,291 B2 | 10/2005 | Moon et al. |
| 7,251,088 B2 | 7/2007 | Matsui |
| 7,259,966 B2 | 8/2007 | Connelly, Jr |
| 7,286,323 B2 | 10/2007 | Oishi |
| 8,620,640 B2 | 12/2013 | Sandorfi et al. |
| 8,908,326 B1 | 12/2014 | Sorenson, III |
| 9,036,294 B1 | 5/2015 | Hua |
| 9,183,087 B2 | 11/2015 | DeCenzo |
| 10,446,186 B1 | 10/2019 | Mendonsa |
| 10,818,318 B2 * | 10/2020 | Herdendorf .......... G11B 27/002 |
| 10,902,879 B2 * | 1/2021 | Mendonsa ............ G06F 3/0611 |
| 2002/0062167 A1 | 5/2002 | Dimitri |
| 2002/0064103 A1 | 5/2002 | Nakanishi |
| 2002/0196580 A1 | 12/2002 | Tsukahara |
| 2003/0040836 A1 | 2/2003 | Deckers |
| 2003/0206367 A1 | 11/2003 | Huang |
| 2004/0202064 A1 | 10/2004 | Inoue |
| 2004/0264042 A1 | 12/2004 | Pollard |
| 2005/0013039 A1 | 1/2005 | Matsumura |
| 2005/0057847 A1 | 3/2005 | Armagost |
| 2005/0094312 A1 | 5/2005 | Sato |
| 2006/0044674 A1 | 3/2006 | Martin |
| 2006/0056103 A1 | 3/2006 | Hamming |
| 2008/0244145 A1 | 10/2008 | Kramlich |
| 2009/0122443 A1 | 5/2009 | Farquhar |
| 2010/0028110 A1 | 2/2010 | Todd |
| 2013/0080713 A1 | 3/2013 | Steinhilber |
| 2015/0362968 A1 | 12/2015 | Jurey et al. |
| 2016/0253108 A1 | 9/2016 | Jurey et al. |
| 2017/0242613 A1 | 8/2017 | Shaw, II et al. |

* cited by examiner

STORAGE SYSTEM WITH ACTUATED MEDIA PLAYER

CROSS-REFERENCE TO RELATED APPLICATIONS

The present application in a continuation of U.S. patent application Ser. No. 16/358,255, now issued as U.S. Pat. No. 10,818,318, entitled "Storage System with Actuated Media Player," and filed on Mar. 19, 2019, which is hereby incorporated by reference for all that it discloses or teaches.

SUMMARY

A storage system includes an actuated media player configured to access multiple storage cartridges arranged in a rack-type library. The actuated media player is adapted to move along a plane relative to a fixed subset of the storage cartridges in a rack to facilitate selective read/write access to each storage cartridge in the fixed subset. These and various other features and advantages will be apparent from a reading of the following detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

The growing use of cloud-based storage solutions has driven demand for low-cost data storage systems capable of retaining large volumes of data. However, as the amount of stored data continues to increase exponentially, so too does the difficulty in ensuring access to the data at speeds acceptable to both service providers and end users. Further complicating these cost and time-to-data access challenges is the demand to make these systems serviceable with minimal system impact. The impact of system maintenance depends greatly on the size of the system's individual field replacement units (FRUs) (e.g., the smallest storage media block that can be removed and replaced individually). If, for example, a storage system includes a sealed enclosure with 6 drives hardwired to a printed circuit board, it may be that all 6 drives have to be taken offline in order to replace a single drive. This disrupts system activities more than a drive replacement in a system where individual drives can be removed and replaced without affecting accessibility and/or power flow to other drives.

There exist a number of different storage systems designed to address one or more of the above challenges. For instance, on-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. While online mass data storage units provide fast access to data (typically less than 2 milliseconds), these systems consume significant power in an on-line state and are therefore considered relatively expensive to operate and maintain.

In contrast, off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. While these systems can be operated at high energy savings as compared to online mass data storage systems, cold storage systems typically offer a slow TTD. A read or write operation may entail retrieving a desired tape from its storage location and loading the tape into an associated drive (player). In some of these systems, a robotic arm is utilized to retrieve each tape, place the tape in the drive, and return the tape to its original shelf position once the read or write is finished. However, there is a significant time delay associated with this round-trip transport of the tape to the drive. Moreover, tape access is further delayed due to the fact that the drive (player) may wind the tape spool to locate data of interest, which can take anywhere from tens of seconds to multiple minutes.

The disclosed mass data storage system, which may provide for either off-line or on-line storage, can achieve TTD much faster than that of off-line tape mass data storage while maintaining build and operating costs competitive with off-line tape mass data storage. This is accomplished, in part, by utilizing robotic actuation to move a media player relative to storage cartridges on a rack-type library. The media player is able to read data from and write data to each storage cartridge without moving the individual storage cartridges from their associated rack positions.

In various implementations, the actuated media player disclosed herein may assume a variety of different characteristics and be used to access (read/write) data on a variety of types of storage media including without limitation disk-based storage (e.g., magnetic disks, optical disks, capacitive disks) and solid state memory (e.g., SSDs). By example and without limitation, exemplary storage media discussed herein include portable storage cartridges that resemble conventional hard drive disks (HDD), but without certain mechanical and electrical features that would otherwise be necessary to enable the cartridge to operate in a stand-alone fashion. Each cartridge may, for example, generally assume the form of an HDD minus control electronics and, in some cases, other elements that can be offloaded from the cartridge and supplied by the actuated media player, such as VCM magnets and spindle motor components. The removal of these elements from the individual cartridges in the library allows the provisioning of a large-scale, high-capacity storage system with the benefits of magnetic disc storage at a significantly lower cost.

Figure 1:
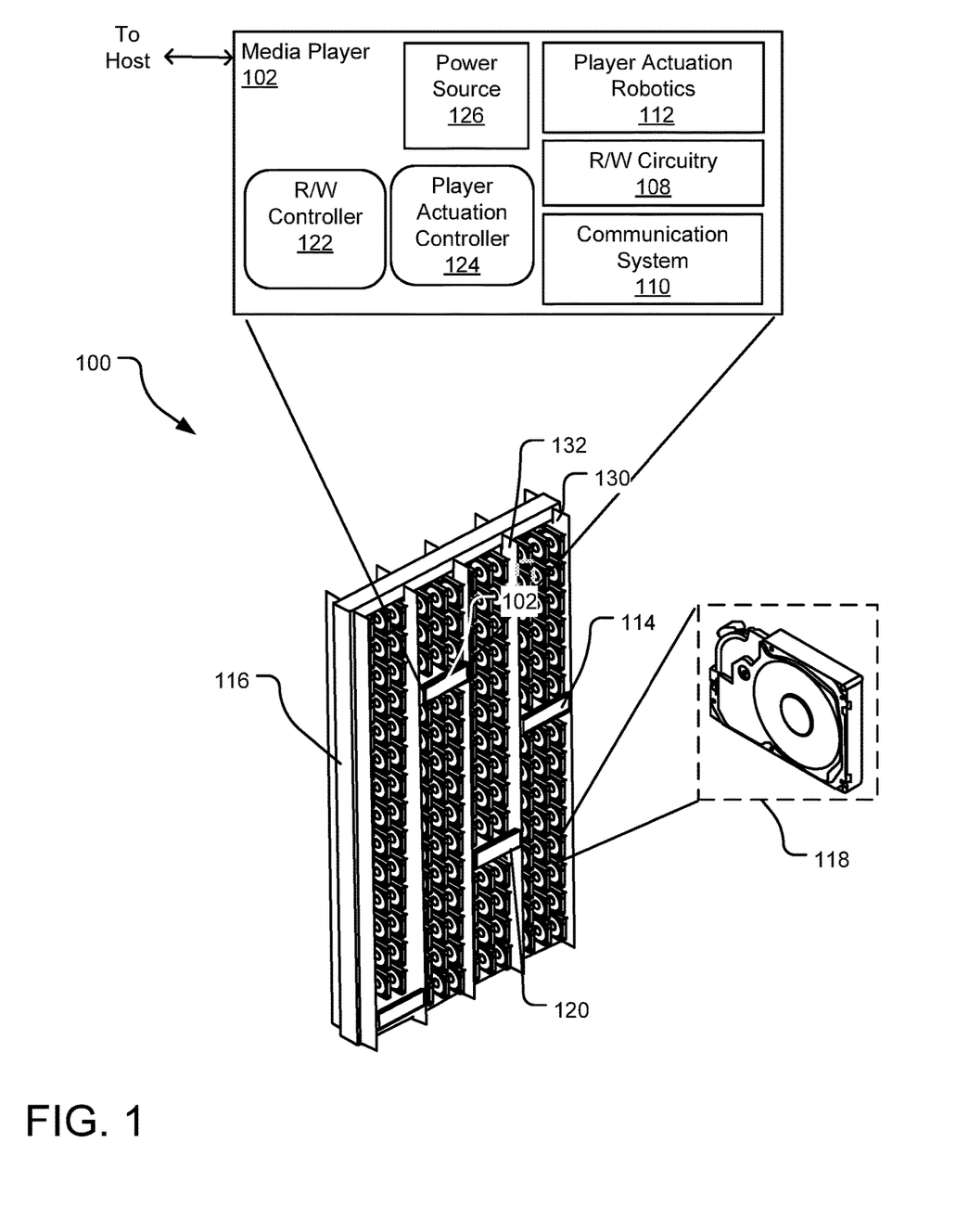
FIG. 1 illustrates an example mass storage system that utilizes one or more robotically-actuated media players to access data stored in a rack-type library.

FIG. 1 illustrates an example mass storage system 100 that utilizes one or more robotically-actuated media players (e.g., media players 102, 114, 120) to access (read data from or write data to) storage cartridges in a rack-type library. Specifically, FIG. 1 illustrates a rack 116 holding a number of storage cartridges (e.g. a storage cartridge 118) arranged in rows and columns on the rack 116. Although FIG. 1 illustrates the single rack 116, the mass storage system 100 may include multiple racks oriented in adjacent or separate physical locations or facilities, each rack having one or more robotically-actuated media players to access its associated storage media.

In one implementation, the mass storage system 100 is an off-line storage system that maintains the individual storage cartridges (e.g., 118) in an off or low power state until selectively powered and accessed by one of the media players 102, 114, or 120. Each of the media players 102, 114, and 120 is designed to move across a range of rack positions and provide access to a subset of the storage cartridges in the rack 116. For example, the media player 102 may be robotically actuated to move up and down relative to a column of storage cartridges and/or to move left and right relative to a row of storage cartridges.

By example and without limitation, the media player 102 is shown to include two controllers—a R/W controller 122 and a player actuation controller 124. In various implementations, the R/W controller 122 and the player actuation controller 124 may include software or a combination of software and hardware, such as control instructions executed by one or more separate or shared device controllers (e.g., microprocessors), peripheral interface controllers ("PICs"), application-specific integrated circuits ("ASICs"), systems on chips ("SoCs"), etc.

The R/W controller 122 selectively controls the R/W circuitry 108 to carry out actions related data access (reads and writes) on select storage cartridges within the rack 116. For example, the R/W controller 122 may control the R/W circuitry 108 to engage switches to open appropriate read/write channels, select a preamplifier and configure preamplifier settings, control actuator movement for positioning various read/write heads of a select storage cartridge, spin up or down a spindle motor within a storage cartridge, controllably actuate a voice coil motor (VCM) within a storage cartridge, and/or control other electronics that facilitate power and data access to (e.g., read write access) the storage cartridges.

The player actuation controller 124, in contrast, selectively controls player actuation robotics 112 to effect movement of the media player 102 relative to the rack 116, such as to position the media player 102 for data access to different media units within the rack 116. The player actuation robotics 112 may include a variety of different components in different implementations, but includes at least a motor that propels the media player 102 in one or more directions across a stage. The stage may be, for example, a rail (e.g., rails 130, 132), a cable pully, or other track usable to guide movement of the media player relative to the rack 116. In one implementation, the player actuation robotics 112 may include a linear motion actuator, such as a rack and pinion linear actuator, a belt-driven linear actuator, a V-guide rail and wheel system, or a screw rail actuator and screw rail guide.

Although the player actuation robotics 112 and the player actuation controller 124 are shown to be internal to the media player 102, some implementations may include aspects of the player actuation controller 124 and/or the player actuation robotics 112 location(s) external to the media player(s) within a given system. For example, the media player 102 may be suspended on a system of cables that are moved in a pully-like fashion by a motor affixed to the rack 116 controlled by a rack controller (not shown).

In operation, the system host (e.g., server, rack-level controller) transmits data access (read and write) commands to the media player 102 that specify target logical block addresses (LBA) for executing associated data access operations. Responsive to receipt of each data access command, the player actuation controller 124 uses a stored logical-to-physical block map to identify a physical storage cartridge location within the rack 116 corresponding to the target LBA. The player actuation controller 124 generates control signals to cause the player actuation robotics 112 to robotically propel the media player 102 across the stage (e.g., the set of rails 130 and 132) to a position suitable for accessing the storage cartridge at the identified physical storage cartridge location. In some implementations, some or all aspects of the player actuation controller 124 and the player actuation robotics 112 are included in the mass storage system 100 at positions external to the media player 102.

In addition to the above-described components, the media player 102 additionally includes a power source 126 (e.g., a power supply line to a host, power outlet, or battery source) and a communication system 110 that enables communications with the host. Communication between the host and the media player 102 are digital or primarily digital, and accomplished via signal transmission between various compute nodes achieved via wired or wireless transmission protocols including, without limitation, one or more inter-integrated circuits ("I2C"), serial advanced technology attachment ("SATA"), serial attached small computer system interface ("SAS"), universal serial bus ("USB"), peripheral component interconnect express ("PCIe"), NVMe, Ethernet, wireless channels, etc. In one implementation, the media player 102 has a hardwired connection (e.g., cable) facilitating communications with the host, such as a rack-level controller (not shown). In another implementation, the media player 102 includes a transceiver and an antenna configured to wirelessly receive and respond to host commands over a local area network (LAN) or a wide area network (WAN).

In addition to being configured for communication with a host, the media players 102, 114, 120 on the rack 116 may further be interconnected to one another as well as to various other compute nodes distributed across other racks controlled by the same or different system hosts. Communication between the storage racks (e.g., the rack 116), host(s), various computer networks, and the external data source(s) and/or destination(s) may occur using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and external data source(s) as desired.

In one implementation, each of the storage cartridges (e.g., the storage cartridge 118) within the rack 116 is a distinct storage medium or set of storage media with certain read/write control removed from the cartridge (e.g., as in a traditional storage drive) and to the media player 102. As a result, media player 102 can selectively power (e.g., power-on, power-off, spin-up, spin-down, etc.) an individual storage cartridge as desired to read data from and/or write data to the cartridge without having to supply power to additional storage cartridges within the rack 116.

In one implementation, the media player 102 is designed to selectively couple with and provide data access to a single one of the storage cartridges at a time. In other implementations, the media player 102 is adapted to simultaneously couple to multiple storage cartridges at once (e.g., two or three adjacent cartridges) and to provide parallel data access operations to two or more of those storage cartridges.

In one implementation, each portable storage cartridge (e.g., the storage cartridge 118) includes a housing which encloses at least one rotatable magnetic recording medium (disc) and at least one data read/write transducer (head). In some embodiments, the housing is a sealed housing. Each head is configured to be aerodynamically supported adjacent a magnetic recording surface of the corresponding disc by an air-fluid bearing established by high velocity rotation of the disc. The head(s) are radially advanced across the recording surface(s) using an actuator arm, and the heads are configured to write data to data tracks defined on the recording surfaces. Each combination of head and disc surface is referred to as a head-disc interface (HDI), so the cartridges of the present disclosure can be characterized as HDI cartridges each having at least one HDI. The housing of each cartridge protects the HDI(s) from contaminants that may interfere with the operation of the cartridge. In some embodiments where environmental controls are sufficiently in place to guard against contaminants, the cartridge may comprise housing such that the internal discs of one cartridge are exposed to the same environment as the internal discs of other cartridges in the system.

The above-described system configuration permits the individual storage cartridges in the rack 116 to be individually removed, serviced, and/or replaced without affecting a flow of data to or from to any of the other storage cartridges. In other implementations, the media player 102 is designed to access data from other types of storage devices, such as SSD devices, tapes etc.

Figure 2:
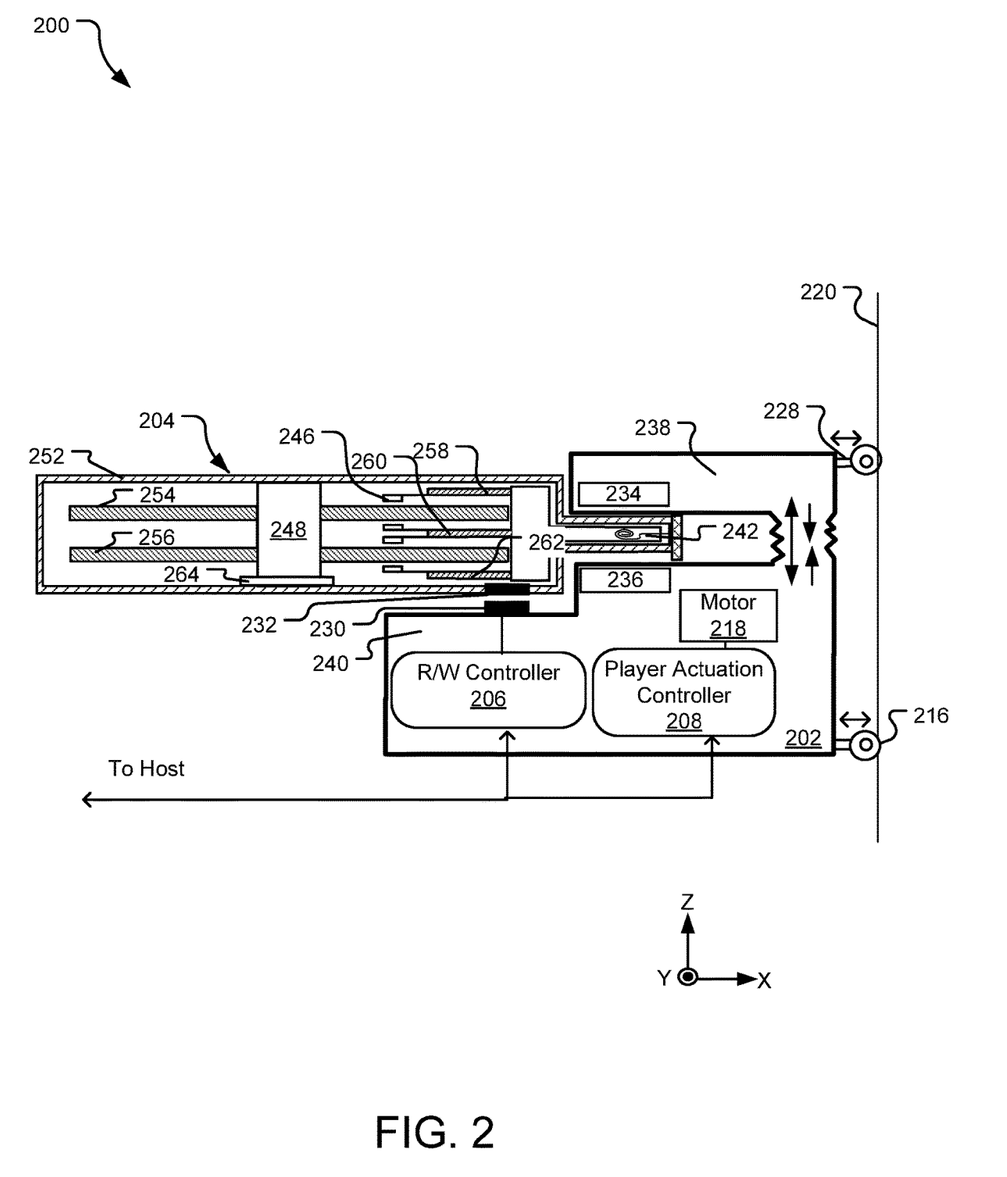
FIG. 2 illustrates a cross-sectional view of a portion of a data storage system including an example robotically-actuated media player that selectively couples itself to and decouples itself from various storage cartridges arranged in a rack-type library.

FIG. 2 illustrates a cross-sectional view of a portion of data storage system 200 including a robotically-actuated media player 202 that selectively couples itself to and decouples itself from various storage cartridges arranged in a rack-type library. In FIG. 2, the robotically-actuated media player 202 is shown coupled to a storage cartridge 204.

The robotically-actuated media player 202 may include several elements the same as or similar to elements of the media player(s) discussed above with respect to FIG. 1 including a R/W controller 206 and a player actuation controller 208. In one implementation, the R/W controller 206 executes firmware commands to controls various hardware elements of the robotically-actuated media player 202 and/or to transmit control signals to the storage cartridge 204.

When coupled to the media player 202 as shown in FIG. 2, the storage cartridge 204 may receive hardware control signals (e.g., power signals, read/write signals) from the robotically-actuated media player 202. As used herein, the term "hardware control signals" refer to analog control signals, such as signals sent from a microprocessor or chip to a hardware component that lacks processing capability. For example, the storage cartridge 204 may receive power signals (e.g., VCM control and spindle motor control) from the robotically-actuated media player 202 through interconnect ports 230, 232 as well as control signals for reading data from and writing data to the storage cartridge 204. According to one implementation, the storage cartridge 204 does not include an internal SOC or other processor for communicating with the robotically-actuated media player 202. For example, communications between the robotically-actuated media player 202 and the storage cartridge 204 may be primarily or exclusively analog communications.

The player actuation controller 208 receives and interprets address signals and controls actuation robotics (e.g., wheels 216, a motor 218) to transport the robotically-actuated media player 202 along a stage 220 (e.g., a rail) and to position the robotically-actuated media player 202 for read/write access to a target storage cartridge. In addition to propelling the robotically-actuated media player 202 along the stage (e.g., in the Z-plane of FIG. 2) the actuation robotics may, in some implementations, provide for movement of the robotically-actuated media player 202 along a secondary plane (e.g., the Y-plane into the page), such so as to enable access to consecutive storage cartridges arranged along row in addition to or in lieu of a column. Depending on the specific product design, the robotically-actuated media player 202 may be capable of providing data access to storage cartridges arranged along single row or column and/or to storage cartridges arranged across multiple rows or columns.

In FIG. 2, the media player further include an actuation mechanism 228 for propelling a portion of the robotically-actuated media player 202 both toward and away from the stage 220, along the X-plane. In this way, an interconnect port 230 on the robotically-actuated media player 202 may be controllably aligned with and selectively mated to a corresponding port 232 on the storage cartridge 204. This port may, for example, include all requisite connections for controlling data access on the storage cartridge 204. In other implementations, the robotically-actuated media player 202 is designed to move with one or more degrees of freedom different from that described above.

In FIG. 2, external voice coil magnets 234 and 236 are shown included within the robotically-actuated media player 202. After the player actuation controller 208 controls the actuation robotics to move the robotically-actuated media player 202 to a target position along the Y-Z plane, the player actuation controller 2208 may control the actuation mechanism 228 to move the robotically-actuated media player 202 in the X-direction to align the interconnect port 230 with the corresponding port 232 on the storage cartridge 204. Once this alignment is achieved, upper and lower end effector elements 238 and 240 of robotically-actuated media player 202 may be actuated toward one another along the Z-axis to mate the interconnect ports 230 and 232 and also to bring the voice coil magnets 234 and 236 into proximity of and alignment with opposite sides of a voice coil 242 included within the storage cartridge 204.

In one implementation, the lower effector element 240 is actuatable according to one or more degrees of freedom independent of the lower voice coil magnet 236. For example, the interconnect port 230 may be mated with the corresponding port 232 prior to (or after) the player actuation controller 208 controls actuation robotics to move the voice coil magnets 234 and 236 into a magnetic coupling of the voice coil 242.

When current is flowed through the voice coil 242 (e.g., from the R/W controller 206 and through the mated interconnect ports 230, 232), the magnetic field generated by the magnets 234, 236 interacts with the electric field of the current moving through the voice coil, and the interaction results in a Lorentz force that pivots an actuator arm (e.g., actuator arm 258) in the storage cartridge 204 to a predetermined radial position relative to a rotating storage media that is rotated by a spindle motor 250.

In other implementations, the robotically-actuated media player 202 does not include the voice coil magnets 234 and 236. For example, the voice coil magnets 234 and 236 may be internal to the storage cartridge 204 as in more traditional hard drive devices. In still another implementation, the VCM of the storage cartridge 204 includes a VCM magnet internal to the storage cartridge 204 and one or more voice coils integrated within the robotically-actuated media player 202 at a location external to the storage cartridge 204. For example, the player actuation controller 208 may control actuation robotics of the robotically-actuated media player 202 to selectively move one or more external voice coil(s) into proximity of the magnetic field generated by the internal VCM magnet when mating the robotically-actuated media player 202 with the storage cartridge 204.

The above-described media player 202 and media player actuation electronics (e.g., player actuation controller 208, the motor 218, the stage 220) permit the storage cartridge 204 to be accessed by the robotically-actuated media player 202 without removing the storage cartridge 204 from its original position on the rack (not shown).

Although other implementations are contemplated, the storage cartridge 204 is shown to include a housing 252 that encases two magnetic recording discs 254, 256, three actuator arms 258, 260, and 262 and four heads (e.g., a head 246) provide a total of four head-to-disk interfaces (HDIs). Any respective numbers of these respective elements can be used as desired, so long as there is at least one disc surface and one associated head to provide at least one HDI within the cartridge. Within the storage cartridge 204, the two discs 254 and 256 are mounted to a disc hub assembly 248 that is rotated by a spindle motor 264.

Figure 3:
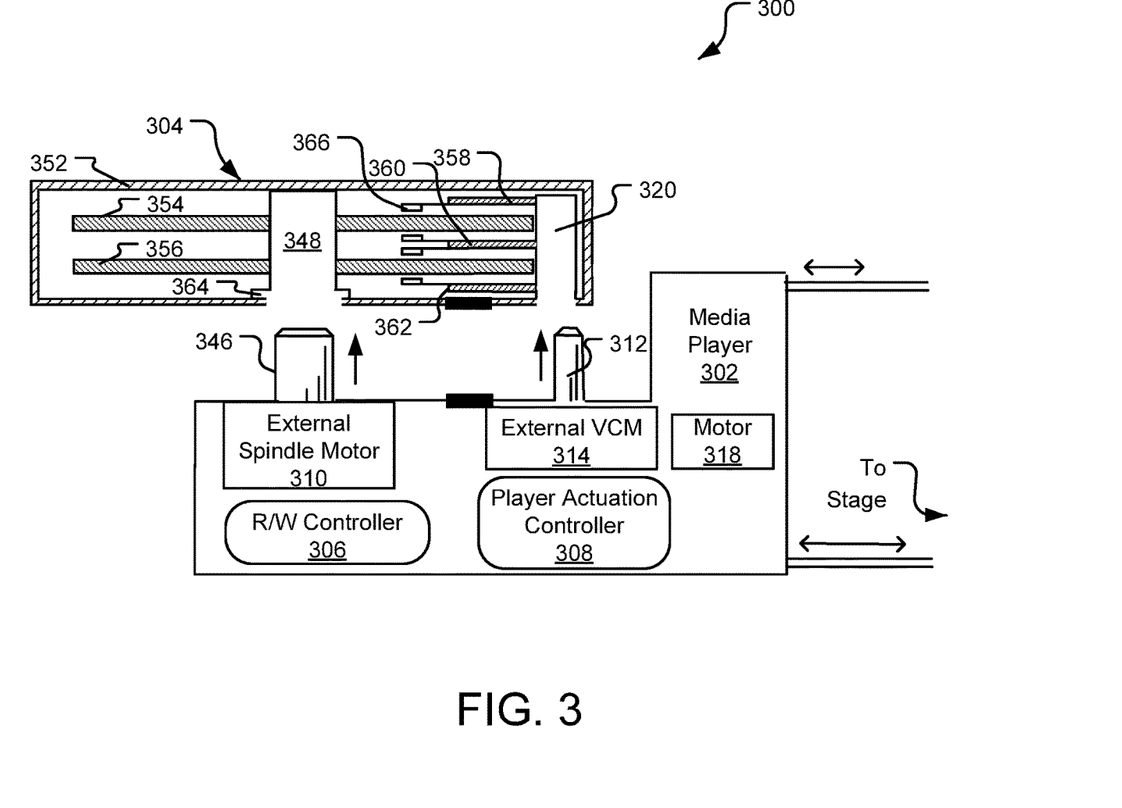
FIG. 3 illustrates a cross-sectional view of a portion of a data storage system including another example robotically-actuated media player that selectively couples itself to and decouples itself from various storage cartridges arranged in a rack-type library.

FIG. 3 illustrates a cross-sectional view of a portion of a data storage system 300 including another example robotically-actuated media player 302 that selectively couples itself to and decouples itself from various storage cartridges arranged in a rack-type library. In FIG. 3, the robotically-actuated media player 302 is shown in position to selectively couple to a storage cartridge 304. The robotically-actuated media player 302 includes several of the same elements shown and described with respect to FIG. 2, including a R/W controller 306, a player actuation controller 308, and a motor 318. Unless stated otherwise like-named components of FIGS. 2 and 3 are assumed to perform the same or similar functions.

In contrast to FIG. 2, the robotically-actuated media player 302 of FIG. 3 further includes an external VCM 314 and an external spindle motor 310. The external VCM 314 includes a shaft 312 designed to extend through an aperture in a housing 352 of the storage cartridge 304 to mate with an actuator hub 320 and rotate actuator arms 358, 360, 362. In this way, the shaft 312 engages the actuator hub 320 to radially advance the heads (e.g., the head 366) across the disc surfaces in response to control inputs supplied to the external VCM 314.

In addition to the external VCM 314, the robotically-actuated media player 302 is also shown to include an external spindle motor 310 with a spindle shaft 346 designed to mate with a spindle hub 348 within the storage cartridge. This mechanical engagement between the spindle shaft 346 and the spindle hub 348 facilitates rotation of the discs 354, 356 upon activation of the external spindle motor 310 and operation of spindle motor circuitry (not shown) by the R/W controller 306. Although the media player 302 of FIG. 3 includes both the external VCM 314 and the external motor 310, still other implementations may include only one of these components while the other is integrated within the storage cartridge 304.

Figure 4:
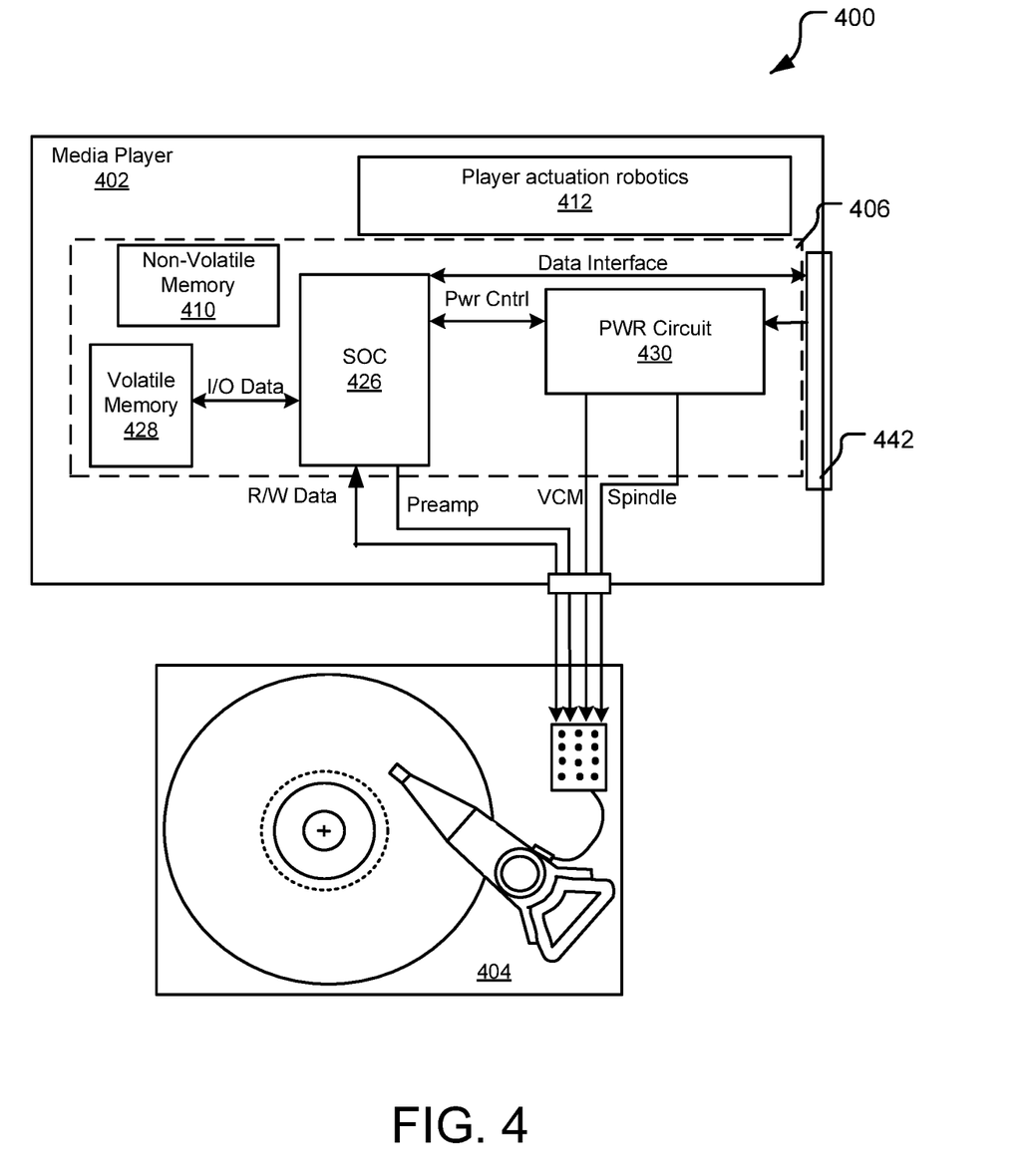
FIG. 4 is a functional block representation of an example robotically-actuated media player configured to move relative to and selectively access storage cartridges in a rack-type library.

FIG. 4 is a functional block representation of a system 400 including an example robotically-actuated media player 402 configured to move relative to and selectively access storage cartridges in a rack-type library. The robotically-actuated media player 402 includes drive access control electronics 406 that provide power and read/write control of the storage cartridge 404. Although the drive access control electronics 406 may include different components in different implementations, the control electronics 406 in FIG. 4 include a system on chip (SOC) control circuit 426, volatile memory 428 (e.g., DRAM), non-volatile memory 410 (e.g., Flash), a power control circuit 430. The SOC 426 includes a programmable processing core that utilizes firmware stored in the volatile memory 428 to provide top level control for the storage cartridge 404. The SOC 426 communicates with an external control circuit, such as a host, local server, rack controller, etc. via an interface connector 442.

In addition to the drive access control electronic 406, the robotically-actuated media player 402 also includes player actuation robotics 412, including for example, a motor (not shown) that propels the robotically-actuated media player 402 across a stage (not shown) relative to the various storage cartridges in the rack-type library.

Responsive to receipt of a command from an external host (e.g., from a rack controller or other external host), the player actuation robotics 412 move the robotically-actuated media player 402 into position to access a target storage cartridge. Such movement may include horizontal and/or vertical movement relative toward the target storage cartridge as well as movements to engage end effector elements (e.g., end effector elements 238, 240 in FIG. 2) of the player toward the target storage cartridge to realize the electrical and mechanical couplings that enable data access.

Once the media player 402 is moved into position and electrically coupled to the target storage cartridge 404, the SOC 426 instructs the power circuit 430 to provide power to the target storage cartridge. In response, the power circuit 430 shunts power from a power supply (not shown) to provide both VCM and spindle motor power signals, as shown.

In addition to commanding the power circuit 430, the SOC 426 may access firmware stored in the non-volatile memory 410 to retrieve operating protocols for the target storage cartridge 404. In some implementations, these operating protocols may be received via transmission from a system host or other external processing device. To read data from a target storage cartridge, the SOC 426 sends a preamplifier control signal to the target storage cartridge 404 via a serial interface or other command connection and the requested data is then read back to the SOC 426 from the target storage cartridge 404.

Aspects of the various control electronics within the media player 602 may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules, or other data resident in a modulated data signal, such as a carrier wave or other signal transport mechanism.

Figure 5:
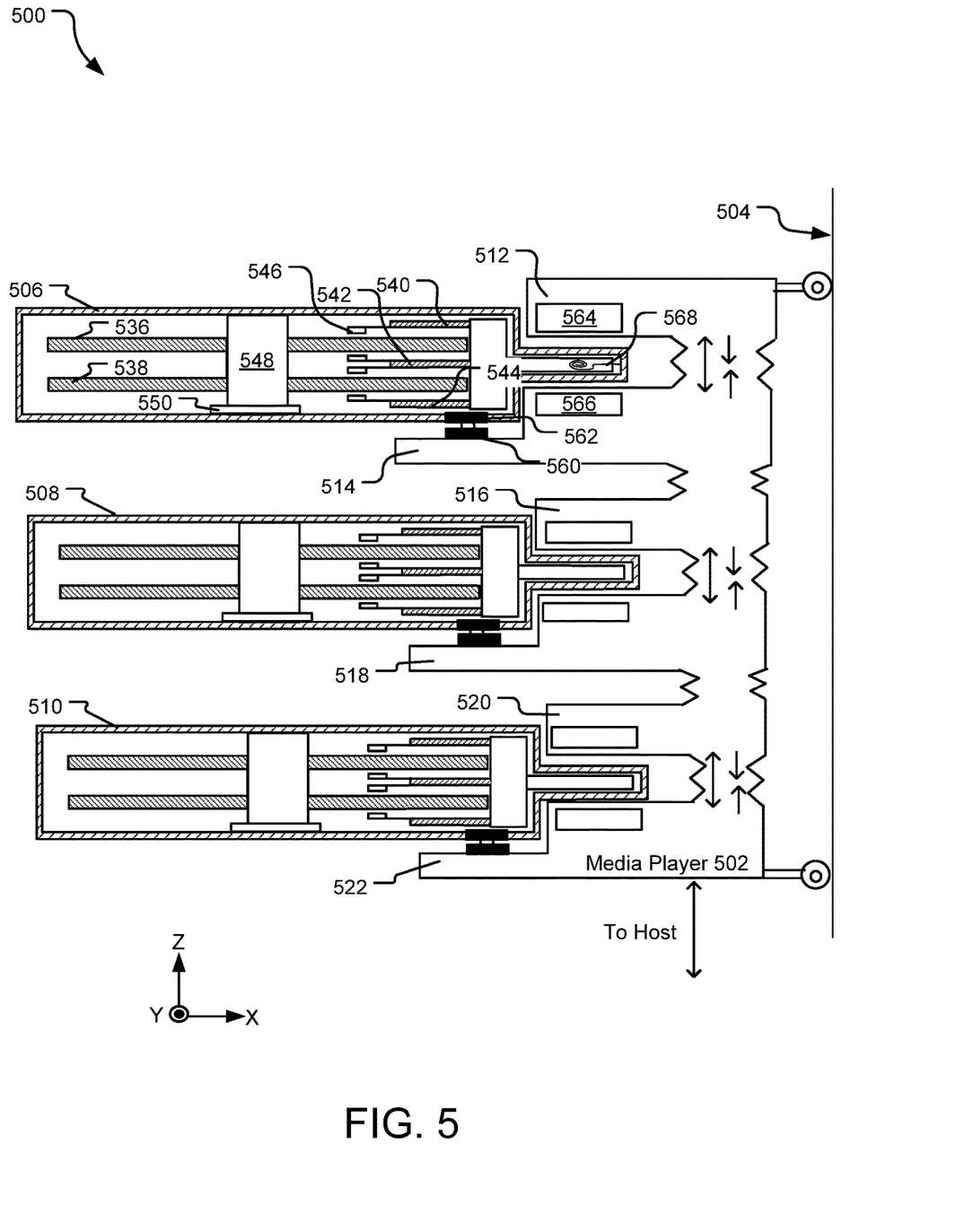
FIG. 5 illustrates an example robotically-actuated media player that provides parallel data access to multiple storage cartridges in a rack-type library.

FIG. 5 illustrates an example robotically-actuated media player 502 that provides parallel data access to multiple storage cartridges in a rack-type library storage system 500. As used herein, "parallel access" refers to simultaneous read or write access to at least two different storage cartridges. According to one implementation, the robotically-actuated media player 502 is adapted to electrically couple to and to provide control signals to multiple storage cartridges at once. The robotically-actuated media player 502 may be actuated along a stage 504 and selectively coupled to and decoupled from various sets of storage cartridges arranged in the rack-type library.

The robotically-actuated media player 502 is designed to couple to three adjacent storage cartridges 506, 508, and 510 at once to execute parallel data access operations on two or on all three of the coupled storage cartridges, depending on the specific control electronics implemented in the design. FIG. 5 may be understood as depicting either a top-down view of the rack-type library storage system 500 or a side view of such as system. For example, the storage cartridges 506, 508, and 510 may be arranged along a same row of a rack but in different columns (shown from the viewpoint looking down at the rack 116 of FIG. 1). In another implementation, the storage cartridges 506, 508, and 510 may be understood as arranged along a same column (e.g., vertically stacked) but in different rows.

Exemplary control electronics for this or similar parallel access designs are discussed with respect to FIG. 6, below. In other implementations, the robotically-actuated media player 502 may be designed to couple with and/or to provide parallel access to different numbers (e.g., greater than three) of storage cartridges shown and described with respect to FIG. 6.

The media player 502 includes robotic actuation elements that facilitate movement of the media player 502 relative to a subset of storage cartridges that remain fixed in the rack. After seeking the media player 502 along the stage 504 to position along the Z-Y plane relative to the storage cartridges 506, 508, and 510, end effector elements 512, 514, 516, 518, 520, and 522 may be further actuated (e.g., either in the X-direction away from the stage 504 or in the Z-direction toward a most-adjacent storage cartridge) to facilitate a mating of electrical ports (e.g., ports 560 and 562) and/or to position external magnetic actuator components (e.g., voice coils or magnets) relative to corresponding internal magnetic actuator components to drive magnetically-actuated components of the storage cartridges.

For example, the robotically-actuated media player 502 may bring the end effector elements 512 and 514 toward the storage cartridge 506 to engage an electrical coupling between ports 560 and 562 and also to position external VCM magnets 564 and 566 in close proximity to a voice coil 568 that is internal to the storage cartridge 506 so as to facilitate generation of localized Lorentz forces by flowing current through the voice coil 568 to selectively position heads supported by an actuator for data access. In various implementations, the robotically-actuated media player 502 may include different types of external magnetic actuator components including without limitation those components described with respect to FIG. 2-3. Components of the robotically-actuated media player 502 not specifically described herein may be the same or similar to like-named components described elsewhere herein.

Figure 6:
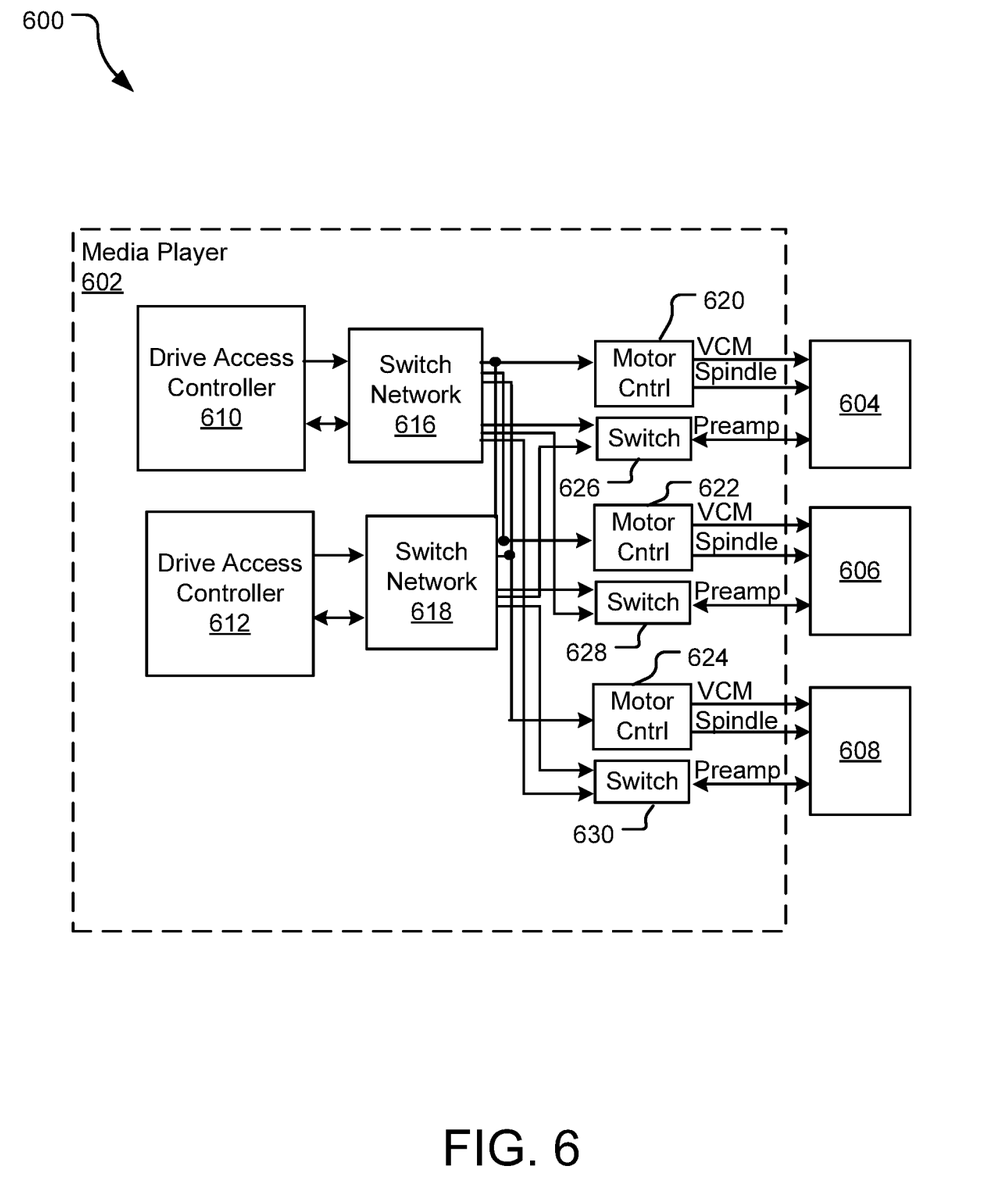
FIG. 6 is a functional block representation of a system including an example robotically-actuated media player that provides parallel data access to multiple storage cartridges in a rack-type library.

FIG. 6 is a functional block representation of a system 600 including an example robotically-actuated media player 602 that provides parallel data access to multiple storage cartridges in a rack-type library. In implementation, the robotically-actuated media player 602 performs functions the same or similar to those described with respect to FIG. 5.

In FIG. 6, the robotically-actuated media player 602 is designed to selectively couple to three storage cartridges 604, 606, and 608 at once and to support parallel data access operations for two storage cartridges at a time. The robotically-actuated media player 602 includes a first drive access controller 610 and a second drive access controller 612. Each of the first drive access controller 610 and the second drive access controller 612 is coupled to a switching network (e.g., switching networks 614 and 616) that each include a plurality of switches creating signal paths to each of the storage cartridges 604, 606, and 608. For example, the switching networks 616 and 618 may each include an array of field effect transistors (an FET bank array) that includes switches for both selecting a target motor controller (e.g., one of the motor controllers 620, 622, and 624), and switches to selectively spin up or down the voice coil and spindle motors of a select one of the storage cartridges 604, 606, and 608.

Each of the switching networks 614 and 616 further couples to an array of read/write switches 626, 628, or 630 that provide selection of readback channel from a select one of the storage cartridges 604, 606, and 608 to either the first drive access controller 610 or the second drive access controller 612. For example, the drive access controller 610 may engage one or more switches in the switch network 616 to select a preamplifier of the storage cartridge 606 as the target for a read operation. The first drive access controller 610 engages the read/write switch 628 to select a readback-path that flows data read from the storage cartridge 606 back to the drive access controller 610 (rather than to the drive access controller 612). In different implementations, the drive access controllers 610 and 612 may utilize different communication protocols including SATA, SAS, PCIe, or other suitable protocol. Other implementations of the disclosed technology may include greater than two data access controllers to allow for parallel accesses to more than two storage cartridges.

In some implementations, each of the drive access controllers 610 and 612 couple to a mini-SAS or SATA single or dual port cage, which supplies a data connection to an external host (e.g., an external controller or server) that has a SAS or SATA host bus adapter. The external host includes an additional communication interface (e.g., an Ethernet network interface) that facilitates communications with the outside world.

In another implementation, one or both of the drive access controllers 610 and 612 include an additional internal application processor (not shown) and Ethernet NIC to facilitate the connection to the outside world via an Ethernet port (e.g., a top-of-the-rack Ethernet switch).

Figure 7:
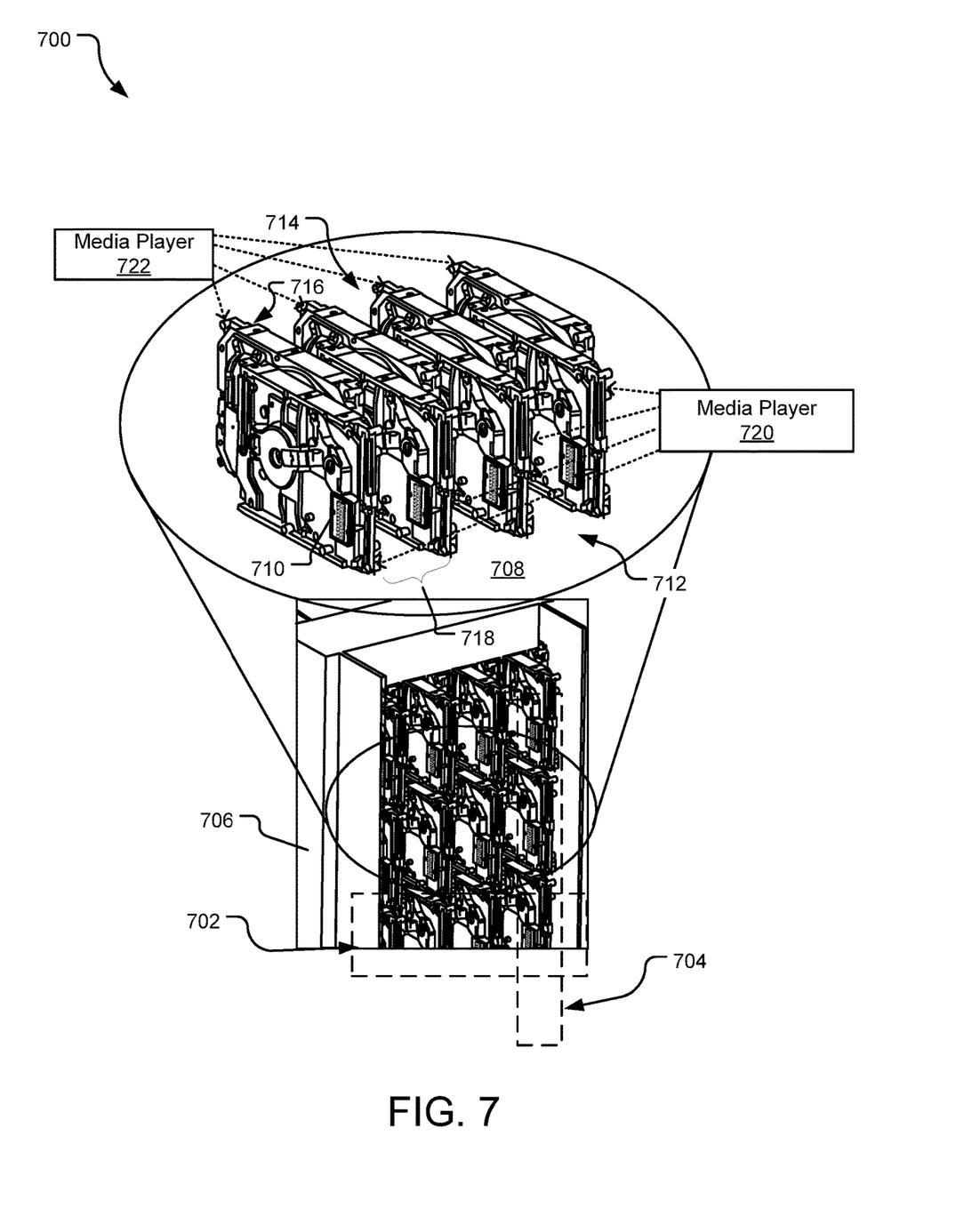
FIG. 7 illustrates an exemplary library arrangement of storage cartridges that may be accessed by a robotically-actuated media player.

FIG. 7 illustrates an exemplary library arrangement 700 of storage cartridges that may be accessed by a robotically-actuated media player (not shown). The library arrangement 700 includes multiple storage cartridges positioned in rows (e.g., a row 702) and columns (e.g., a column 704) within a rack 706. As shown in greater detail in expanded view 708, the each row of the rack 706 includes alternating, interleaved storage cartridges that are rotated in opposite directions and spatially offset from one another in opposite directions such that a first subset of alternating storage cartridges have access ports (e.g., an access port 710) accessible on a first side 712 of the rack 706 and a second subset of alternating storage cartridges have access ports accessible on a second opposite side 714 of the rack 706 (e.g., access port position 716).

Spacings (e.g., a spacing 718) between alternating storage cartridges allow room for end effector elements of the media player (not shown) to move into proximity of and selectively coupling to each storage cartridge in the rack 706.

In the implementation of FIG. 7, the library arrangement 700 may include multiple robotically-actuated media players with at least one media player positioned to access the first side 712 of the rack 706 and at least one media player positioned to access the second, opposite side 714 of the rack. In this sense, alternating storage cartridges within a same row are accessed by different media players. For example, odd-numbered storage cartridges in a row are accessed by a first robotically-actuated media player 720 that scales a front side of the rack 706 and even-numbered storage cartridges in a row are accessed by a second robotically-actuated media player 722 that scales a back side of the rack.

This compact rack concept with interleaved storage cartridges offset from one another in opposite directions allows physical couplings to be established between the media players and select storage cartridge without sacrificing rack storage capacity for such capability.

Figure 8:
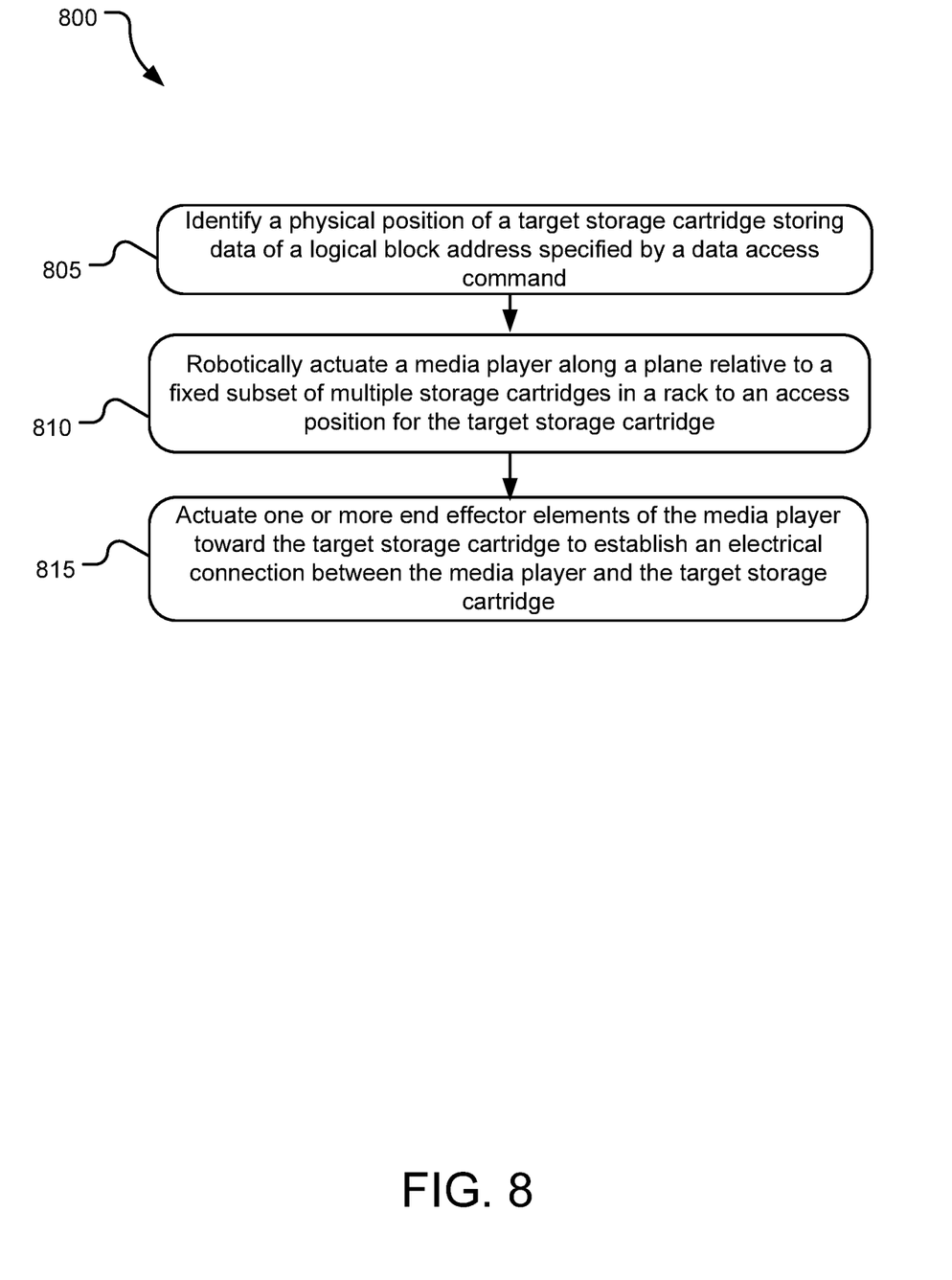
FIG. 8 illustrates example operations for accessing data with a robotically-actuated media player.

FIG. 8 illustrates example operations 800 for accessing data with a robotically-actuated media player. An identification operation 805 identifies a physical position of a target storage cartridge storing data of a logical block address (LBA) specified by a received data access (read/write) command. An actuation operation 810 robotically actuates a media player along a plane relative to a fixed subset of storage cartridges in a rack to position the media player at an access position for the target storage cartridge. Another actuation operation 815 actuates one or more end effector elements of the media player toward the target storage cartridge when the media player is at the access position. The actuation operation 815 establishes an electrical connection between the media player and the target storage cartridge to facilitate execution of the data access command on the target storage cartridge.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
    a data storage library including multiple storage cartridges arranged in a rack;
    a media player including actuation mechanics adapted to move the media player along a plane relative to a fixed subset of the multiple storage cartridges in the rack to an access position for a target storage cartridge, wherein the media player includes end effector elements actuatable toward the target storage cartridge to mate with corresponding interconnect ports of the target storage cartridge.

2. The system of claim 1, wherein the end effector elements are actuatable to position at least one external magnetic actuator component of the media player relative to a corresponding internal magnetic actuator component of the target storage cartridge to drive at least one of a spindle motor and a voice coil motor.

3. The system of claim 1, wherein actuating the end effector elements establishes an electrical coupling between the media player and the target storage cartridge.

4. The system of claim 1, wherein the media player is adapted to access the target storage cartridge without moving the target storage cartridge from an original fixed position within the rack.

5. The system of claim 1, wherein the actuation mechanics include actuation robotics adapted to move the media player along a plane parallel to at least one of a row and column of storage cartridges in the rack.

6. The system of claim 1, wherein the media player is configured to provide parallel accesses to a subset of the multiple storage cartridges in the fixed subset.

7. The system of claim 1, wherein the rack includes a first subset of storage cartridges in a row that each face a first direction to facilitate coupling with the media player on a first side of the rack and the rack further includes a second subset of storage cartridges in the row facing a second opposite direction to facilitate coupling with a second media player on a second side of the rack, the first subset of storage cartridges being interlaced with the second subset of cartridges.

8. The system of claim 1, wherein the media player adapted to selectively couple with and provide access to data stored on each one of the storage cartridges in the fixed sub set.

9. A method comprising:
    identifying a physical location of a storage cartridge targeted by a data access command, the storage cartridge residing in a rack including multiple storage cartridges; and
    actuating a media player along a plane relative to a fixed subset of the multiple storage cartridges in the rack to an access position for a target storage cartridge of the multiple storage cartridges, the media player including end effector elements that actuate toward and mate with corresponding interconnect ports of the target storage cartridge.

10. The method of claim 9, wherein the end effector elements are actuatable to position at least one external magnetic actuator component of the media player relative to a corresponding internal magnetic actuator component of the target storage cartridge to drive at least one of a spindle motor and a voice coil motor.

11. The method of claim 9, wherein actuating the end effector elements establishes an electrical coupling between the media player and the target storage cartridge.

12. The method of claim 9, wherein the media player is configured to provide parallel accesses to a subset of the multiple storage cartridges in the fixed subset.

13. The method of claim 9, wherein the rack includes a first subset of storage cartridges in a row facing a first direction to facilitate coupling with the media player on a first side of the rack and the rack further includes a second subset of the storage cartridges in the row facing a second opposite direction to facilitate coupling with a second media player on a second side of the rack, the first subset of cartridges being interlaced with the second subset of cartridges.

14. A system comprising:
 a data storage library including a rack supporting a number of storage cartridges, a first subset of the storage cartridges in a row facing a first direction and a second subset of the storage cartridges in the row facing a second opposite direction;
 a first media player that robotically actuates in a plane parallel to the row on a first side of the rack to an access position associated with each storage cartridge in the first subset; and
 a second media player that robotically actuates in a plane parallel to the row on a second side of the rack opposite to the first side of the rack to an access position associated with each storage cartridge in the second subset.

15. The system of claim 14, wherein the first media player provides storage access to odd-numbered storage cartridges in the row and the second media player provides storage access to even-numbered storage cartridges in the row.

16. The system of claim 14, wherein the first media player is adapted to access each one of the storage cartridges in the first subset without moving the storage cartridges from original fixed positions within the rack.

17. The system of claim 14, wherein each of the first media player and the second media player include end effector elements actuatable toward a target storage cartridge in the rack to position at least one external magnetic actuator component of the media player relative to a corresponding internal magnetic actuator component of the target storage cartridge to drive at least one of a spindle motor and a voice coil motor.

18. The system of claim 17, wherein actuating the end effector elements establishes an electrical coupling between the media player and the target storage cartridge.

* * * * *